3,236,849
PYRIMIDINE COMPOUNDS
Edward F. Elslager and Donald F. Worth, Ann Arbor, Mich., assignors to Parke, Davis & Company, Detroit, Mich., a corporation of Michigan
No Drawing. Filed Jan. 23, 1961, Ser. No. 83,910
2 Claims. (Cl. 260—256.4)

The present invention relates to salts of 2,4-diamino-5-(p-chlorophenyl)-6-ethylpyrimidine of the formula

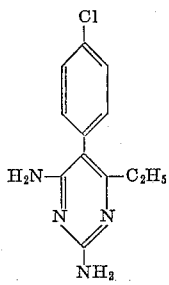

with 4,4'-methylenebis(3-hydroxy-2-naphthoic acid), or pamoic acid of the formula

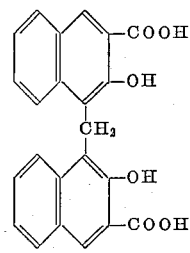

and with 2,6-dihydroxyisonicotinic acid or citrazinic acid of the formula

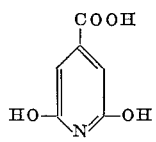

and to methods for their production.

The compounds of the invention are produced by reacting 2,4 - diamino - 5 - (p-chlorophenyl)-6-ethyl-pyrimidine with 4,4'-methylenebis(3-hydroxy-2-naphthoic acid) or with 2,6-dihydroxyisonicotinic acid; or by reacting a soluble salt of 2,4 - diamino-5-(p-chlorophenyl)-6 - ethylpyrimidine with a soluble salt of 4,4'-methylene-bis(3-hydroxy-2-naphthoic acid) or with a soluble salt of 2,6-dihydroxyisonicotinic acid. The term "soluble salt" is used herein in a relative sense and means a degree of solubility substantially greater than that exhibited by the products of the invention. Representative soluble salts suitable for use in the process of the invention include 2,4 - diamino - 5 - (p-chlorophenyl)-6-ethylpyrimidine hydrochloride, hydrobromide, hydriodide, sulfate, phosphate, sulfamate, acetate, lactate, tartrate, gluconate, citrate, and salicylate; as well as alkali metal, alkaline earth metal ammonium and amine salts of 4,4'-methylene-bis(3-hydroxy-2-naphthoic acid) and 2,6 - dihydroxyiso-nicotinic acid. If desired, the starting materials used in the process can be converted in situ to the desired base, acid, or soluble salt form by treatment with an acid or base, as by neutralizing one or more of the carboxyl groups with base, by treatment of a carboxylate salt with a mineral acid, or by treatment of the pyrimidine base with an acid. The process of the invention is preferably carried out in a solvent in which the reactants are at least partially soluble and which is relatively unreactive toward each of the reactants. Suitable solvents include water, aqueous alkanols, dimethylacetamide, dimethylformamide, and acetonitrile and mixtures thereof. Other satisfactory reaction media can be chosen from among a wide variety of solvents, particularly those which are neutral and polar. The salt formation proceeds fairly rapidly upon mixing the reactants in the selected solvent. The process can be carried out at room temperature or below, although in many cases a high yield and a crystalline form conducive to rapid filtration are facilitated by heating the reaction mixture for up to about an hour and then chilling it. The reactants are customarily employed in approximately the same ratio in which they appear in the desired final product. In the case of 2,4-diamino-5-(p-chlorophenyl)-6-ethylpyrimidine and 2,6 - dihydroxyisonicotinic acid these reactants or soluble salts thereof are employed in approximately equimolar quantities. If it is desired to obtain the salt of 2,4-diamino-5-(p-chlorophenyl)-6-ethylpyrimidine with one-half formula weight of 4,4' - methylenebis(3 - hydroxy - 2 - naphthoic acid) it is customary to employ these reactants or soluble salts thereof in the ratio of 2 moles of the former to 1 mole of the latter. If itis desired to obtain the salt of 2,4-diamino - 5 - (p - chlorophenyl) - 6 - ethylpyrimidine with one formula weight of 4,4'-methylenebis(3-hydroxy-2-naphthoic acid) best results are obtained by reacting a soluble salt of 2,4 - diamino - 5 - (p-chlorophenyl)-6-ethylpyrimidine with an equimolar quantity of a soluble salt of 4,4' - methylenebis(3-hydroxyl-2-naphthoic acid) in the presence of one equivalent of a mineral acid. In those cases where the reaction product precipitates directly it is isolated by filtration or centrifugation. In those instances where it does not precipitate directly it is first made insoluble by concentration of the reaction mixture or by dilution of the reaction mixture with a solvent in which the product is insoluble, and then collected.

The products of the invention are antimalarial agents exhibiting especially long duration of action. It is known that 2,4 - diamino - 5 - (p-chlorophenyl)-6-ethylpyrimidine, otherwise known as pyrimethamine, is an antimalarial drug and is highly active against erythrocytic parasites. However, for collective prophylaxis the usual recommended adult dose is 25 mg. administered once a week. For large scale malaria eradication programs it is impractical to administer an antimalarial agent on such a frequent schedule. However, the compounds of the present invention possess the high antimalarial activity of 2,4 - diamino - 5 - (p-chlorophenyl)-6-ethylpyrimidine, are non-irritating upon injection, and exhibit unusually long duration of action, thereby making it possible to extend the dosage interval from one week to as long as several months. The products of the invention can be formulated into suspensions which are pharmaceutically acceptable for intramuscular injection, using suspending vehicles such as 40% benzyl benzoate and 60% castor oil, or water containing emulsifying or dispersing agents.

The invention is illustrated but not limited by the following examples.

*Example 1*

A warm, filtered soltuion of 4.50 g. of 4,4'-methylene-bis(3-hydroxy-2-naphthoic acid) disodium salt monohydrate in 300 ml. of methanol is added to a solution of 4.97 g. of 2,4-diamino-5-(p-chlorophenyl)-6-ethylpyrimidine in 400 ml. of methanol and 20 ml. of 1.0-normal hydrochloric acid. The solution is heated on a steam bath for about 15 minutes, at which time a crystalline precipitate begins to form. The mixture is concentrated to a volume of 200 ml. and cooled. The precipitated product is collected on a filter and dried in vacuo at 60° C. for 18 hours. This product is the hydrated salt of 2,4-diamino-5-(p-chlorophenyl) - 6 - ethylpyrimidine with one-half formula weight 4,4'-methylenebis(3-hydroxy-2-naphthoic acid); colorless solid, M.P. 255–257° C. The structural formula of the anhydrous form is

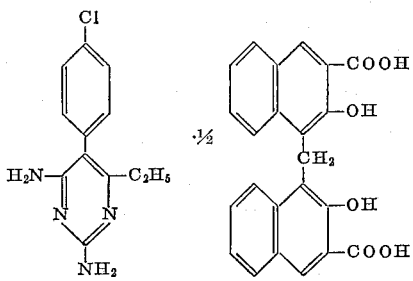

The dipotassium salt of 4,4'-methylenebis(3-hydroxy-2-naphthoic acid) can be substituted for the disodium salt in the foregoing procedure. Likewise, other soluble salts of 2,4-diamino-5-(p - chlorophenyl) - 6 - ethylpyrimidine, such as the sulfate or acetate can be used in place of the hydrochloride.

Example 2

Ten ml. of 1.0-normal hydrochloric acid is added to a solution of 4.50 g. of 4,4'-methylenebis(3 - hydroxy - 2-naphthoic acid) disodium salt monohydrate in 100 ml. of warm methanol. This mixture is then added with vigorous stirring to a solution of 2.49 g. of 2,4-diamino-5-(p-chlorophenyl)-6-ethylpyrimidine in 200 ml. of methanol containing 10 ml. of 1.0-normal hydrochloric acid. The precipitated product is collected on a filter and dried in vacuo at 60° C. This product is the 2,4-diamino-5-(p-chlorophenyl)-6-ethylpyrimidine salt with one formula weight 4,4'-methylenebis(3-hydroxy - 2 - naphthoic aicd); yellow solid, M.P. indistinct beginning at 195° C.

Example 3

A solution of 4.50 g. of 4,4'-methylenebis(3-hydroxy-2-naphthoic acid) disodium salt monohydrate in 100 ml. of warm methanol is added to a solution of 2.49 g. of 2,4-diamino-5-(p-chlorophenyl)-6-ethylpyrimidine in 200 ml. of methanol containing 20 ml. of 1.0-normal hydrochloric acid. The pale yellow solution is chilled and the crystalline precipitate collected on a filter, washed with water, and dried. This product is the 2,4-diamino-5-(p-chlorophenyl)-6-ethylpyrimidine salt with one formula weight 4,4'-methylenebis(3-hydroxy - 2 - naphthoic acid); yellow solid, M.P. indistinct beginning at 195° C.

Example 4

A solution of 1.55 g. of 2,6-dihydroxyisonicotinic acid in 50 ml. of hot dimethylacetamide is added to a stirred solution of 2.49 g. of 2,4-diamino-5-(p-chlorophenyl)-6-ethylpyrimidine in 200 ml. of hot methanol. The mixture is cooled and the light-colored product, salt of 2,4-diamino-5-(p-chlorophenyl) - 6 - ethylpyrimidine with one formula weight 2,6-dihydroxyisonicotinic acid, is collected on a filter, and dried in vacuo at 80° C. for 18 hours; M.P. about 235° C. with decomposition after crystallization from an ethanol-water mixture. The structural formula is

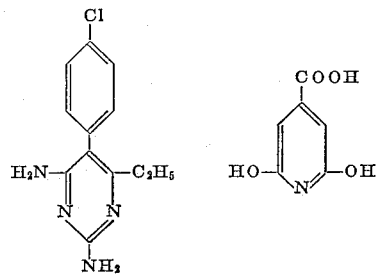

We claim:
1. 2,4-diamino-5-(p-chlorophenyl) - 6 - ethylpyrimidine salts with 4,4'-methylenebis(3-hydroxy-2-naphthoic acid).
2. 2,4-diamino-5-(p-chlorophenyl) - 6 - ethylpyrimidine salt with one-half formula weight 4,4'-methylenebis(3-hydroxy-2-napthoic acid).

References Cited by the Examiner
UNITED STATES PATENTS

| | | | |
|---|---|---|---|
| 1,872,826 | 8/1932 | Schulemann et al. | 260—288 |
| 2,547,782 | 4/1951 | Rhodehamel | 260—472 |
| 2,576,939 | 12/1951 | Hitchings et al. | 260—256.4 |
| 2,925,417 | 2/1960 | Elslager et al. | 260—240 |

OTHER REFERENCES

Barber et al., J. App. Chem., vol. 2, pages 565–75 (1952).

Burger, Medicinal Chemistry (New York, 1960), pages 46–47.

NICHOLAS S. RIZZO, *Primary Examiner.*

IRVING MARCUS, DUVAL T. McCUTCHEN, WALTER A. MODANCE, *Examiners.*